United States Patent [19]

Gallup et al.

[11] Patent Number: 5,413,718
[45] Date of Patent: May 9, 1995

[54] USE OF ADDED WATER TO ACHIEVE 100% INJECTION WEIGHT IN GEOTHERMAL OPERATIONS

[75] Inventors: Darrell L. Gallup, Chino; John L. Featherstone, El Centro, both of Calif.

[73] Assignee: Union Oil Company of California, Los Angeles, Calif.

[21] Appl. No.: 130,114

[22] Filed: Sep. 30, 1993

Related U.S. Application Data

[63] Continuation-in-part of Ser. No. 717,527, Jun. 19, 1991, and a continuation-in-part of Ser. No. 861,323, Mar. 31, 1992, which is a continuation-in-part of Ser. No. 717,527, Jun. 19, 1991.

[51] Int. Cl.[6] ................................. C02F 5/08
[52] U.S. Cl. .......................... 210/696; 60/641.5; 166/267; 166/310; 210/700; 210/727; 210/718; 210/719; 210/747; 210/750; 210/757; 588/17
[58] Field of Search .................... 60/641.2, 641.5; 166/267, 310; 210/696–701, 713, 714, 719, 723, 726, 727, 728, 734, 747, 750, 757, 718

[56] References Cited

U.S. PATENT DOCUMENTS

| | | | |
|---|---|---|---|
| 1,592,647 | 7/1926 | Speller | 210/750 |
| 4,437,995 | 3/1984 | Rex | 210/714 |
| 4,500,434 | 2/1985 | Jost et al. | 60/641.2 |
| 4,522,728 | 6/1985 | Gallup et al. | 210/747 |
| 4,537,684 | 8/1985 | Gallup et al. | 210/641.2 |
| 4,615,808 | 10/1986 | Gallup et al. | 210/714 |
| 4,728,438 | 3/1988 | Featherstone et al. | 210/713 |
| 4,830,766 | 5/1989 | Gallup et al. | 252/8.552 |
| 4,869,066 | 9/1989 | Pye et al. | 60/641.5 |
| 4,874,529 | 10/1989 | Featherstone et al. | 210/713 |
| 5,024,769 | 6/1991 | Gallup et al. | 210/721 |
| 5,028,340 | 7/1991 | Gallup | 210/753 |
| 5,032,284 | 7/1991 | Gallup et al. | 210/697 |
| 5,044,439 | 9/1991 | Cenegy et al. | 210/701 |
| 5,061,373 | 10/1991 | Gallup | 210/697 |
| 5,073,270 | 12/1991 | Gallup et al. | 210/698 |
| 5,085,782 | 2/1992 | Gallup et al. | 210/696 |
| 5,098,578 | 3/1992 | Gallup et al. | 210/696 |
| 5,145,515 | 9/1992 | Gallup et al. | 75/712 |
| 5,145,656 | 9/1992 | Gallup et al. | 423/42 |
| 5,167,834 | 12/1992 | Gallup et al. | 210/747 |
| 5,182,027 | 1/1993 | Gallup et al. | 210/696 |
| 5,240,687 | 8/1993 | Gallup et al. | 423/42 |
| 5,246,593 | 9/1993 | Gallup | 210/709 |
| 5,256,301 | 10/1993 | Gallup et al. | 210/696 |
| 5,268,108 | 12/1993 | Gallup et al. | 210/698 |
| 5,288,411 | 2/1994 | Gallup et al. | 210/700 |

FOREIGN PATENT DOCUMENTS 788112  12/1957  United Kingdom ............... 210/757

Primary Examiner—Peter A. Hruskoci
Attorney, Agent, or Firm—Charles L. Hartman; William O. Jacobson; Gregory F. Wirzbicki

[57] ABSTRACT

Geothermal brines are extracted from the earth, flashed and the remaining liquids are injected back into the earth. Although it would be advantageous for resource maintenance to inject the same amount of liquid as extracted, addition of liquid causes massive system upsets that prevent such addition. River or other similar surface waters can now be added to the brine stream created when extracting power from a geothermal source, after adding a crystal structure modifier to the brine stream. In operations where the brine stream is returned to the earth, the weight rate of the brine injected into the earth is brought to at least 90% what it was when extracted from the ground.

22 Claims, 1 Drawing Sheet

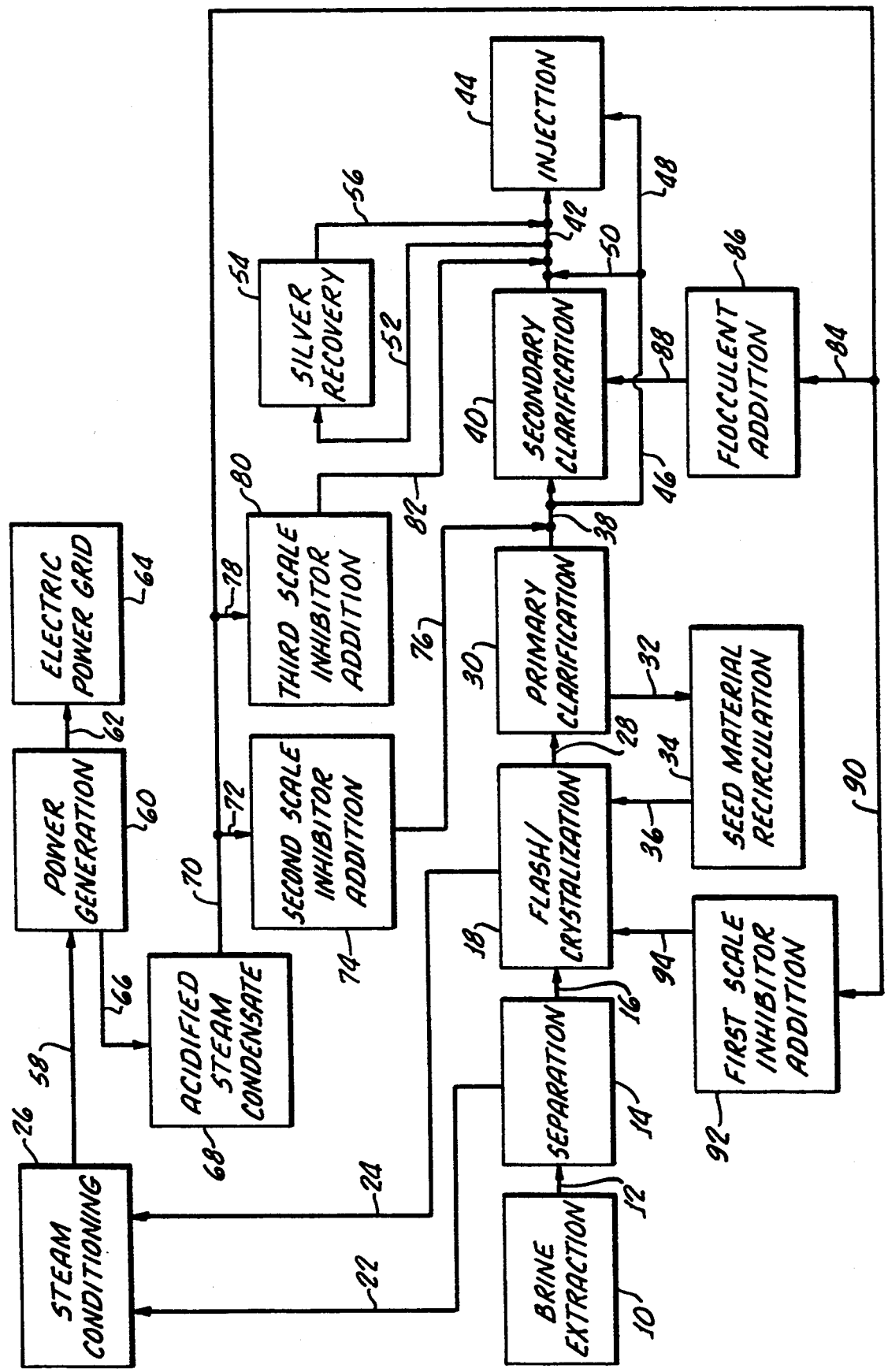

USE OF ADDED WATER TO ACHIEVE 100% INJECTION WEIGHT IN GEOTHERMAL OPERATIONS

This application is a continuation-in-part of (1) application Ser. No. 717,527, filed Jun. 19, 1991; and (2) application Ser. No. 861,323, filed Mar. 31, 1992 which is a continuation-in-part of application Ser. No. 717,527, filed Jun. 19, 1991.

BACKGROUND OF THE INVENTION

1. Field of the Invention

This invention relates to methods for utilizing geothermal resources to produce energy, and, in particular, to methods of maintaining the volume of the liquid injected back into the ground.

2. State of the Art

Geothermal fluids contain vast amounts of thermal energy, which can be used to produce electrical power. In one process for producing electrical power, a naturally pressurized, hot, substantially liquid geothermal brine is recovered from a subterranean reservoir, then suddenly depressurized, or, as termed herein, flashed. This produces steam from the brine while cooling the liquid brine. The cooled geothermal brine is processed further and then typically injected into the ground to replenish the aquifer and prevent ground subsidence, particularly in the Salton Sea, Calif., which is already below sea level.

In a geothermal operation, it is important to inject about the same amount of liquid back into the ground as is removed. If water is not added to the subterranean reservoir, then the concentration of solids in the brine removed from the ground will increase. Adding water keeps the concentrations of salts and other solids in the brine removed for flashing at about the same concentration over the period of time the geothermal field is in operation. Liquid cannot just be dumped into the brine liquid stream remaining after flashing to bring it up to the original volume since the brine is extremely sensitive to additions of foreign liquids, and the overall system prone to upsets, if the liquids are not matched exactly correctly.

As the brine is flashed, many of these components (both ions and minerals) precipitate out of the remaining liquid solution. Some minerals, typically silicon-containing compounds—particularly silica and silicate-containing minerals, such as iron silicate—form small particles that precipitate slowly. The slow precipitation means that these already precipitating minerals form solids that plug the downstream fluid handling and injection apparatus. Therefore, it is greatly preferred to force these slowly precipitating solids out of the liquid before injection using a flocculent added to the brine in a clarification process. U.S. Pat. No. 4,874,529, issued to Featherstone, which Patent is hereby incorporated in full by reference, discusses the problem of slowly precipitating fine particulates and describes the solution of adding a flocculating agent to the secondary clarification zone as the solution to the problem.

However, not all minerals precipitate from the brine solution slowly. Alkaline earth salts (for example, barium sulfate, also known as barite, and calcium fluoride) are among the minerals frequently found in significant concentrations in geothermal brines. Alkaline earth salts tend to precipitate fairly quickly. During the flashing step alkaline earth sulfates (for example, barium sulfate) start to precipitate and continue precipitating down-stream during further handling of the brine as it continues to cool. Barium sulfate presents an annoying problem in many geothermal systems since it starts to precipitate when the cooling brine is still as hot as 340° F., a temperature produced early on in the energy production process, triggering the early precipitation of barium sulfate.

Now, the precipitation of barium sulfate has been implicated in a more serious precipitation problem. It has been noticed that the crystalline material precipitated at some geothermal sites becomes more radioactive as the site ages. The radioactivity, contained in naturally occurring radioactive materials, or NORMs, is believed to result from tapping into new subterranean formations containing trace amounts of a radioactive alkaline earth sulfate—radium sulfate—which apparently coprecipitates with the chemically similar barium sulfate. It is important to reduce the levels of NORMs in the material that precipitates during the clarification process on the processing equipment to as low a level as possible. The problem is solved in U.S. patent application Ser. No. 717,527, filed Jun. 19, 1991, now allowed, and incorporated herein in full by reference by using crystal structure modifiers to prevent NORMs precipitation before injection.

Before the brine stream can be injected, the amount of liquid in the brine stream should be brought back to nearly the same amount as was removed from the ground. However, the brines contain dissolved components that often cause processing problems. If surface water is added to the brine stream as it is—without some sort of prior processing—the added water will cause system upsets. It would be advantageous to have a system that allowed the addition of a liquid to bring the volume of the brine back to the removal volume before injection while avoiding system upsets to keep NORMs and the like in solution.

SUMMARY OF THE INVENTION

In this invention about the same amount of water is injected as was extracted. Because the brine undergoes pressure and temperature changes, the most convenient way to measure the amount is by weight. In the present invention, enough surface water is added to the brine stream that the weight rate per hour of liquid injected is at least 90% of the weight rate per hour of brine extracted. The surface water is added after crystal structure modifier has been added to the brine stream to prevent system upsets. The alkaline earth salts present in the aqueous liquid, including those implicated in NORMs deposition, therefore remain suspended in the aqueous solution during its residence in the clarification zone while the silicon-containing components are precipitating. Then an aqueous liquid having at least 90% of the weight rate of the liquid extracted from the earth can be injected back into the earth to prevent ground subsidence and to dispose of the NORMs.

In this invention the preferred scale inhibitors are crystal structure modifiers, particularly preferred are the phosphonoalkylated amines. Other potential crystal structure modifiers include polyphosphonic acids, phosphonoalkylated amines, aminoalkyl phosphonates, phosphate esters, and phosphonocarboxylate.

BRIEF DESCRIPTION OF THE DRAWINGS

The FIGURE shows a process flow scheme of a geothermal plant incorporating the process of this invention.

DETAILED DESCRIPTION OF THE INVENTION

Referring to the FIGURE, a scheme is shown to produce power from geothermal brine using a continuous process. Following first the path of the liquid brine stream, hot brine is extracted from the ground at the extraction step 10 and introduced through line 12 to wellhead separation step 14 where steam is generated, reducing the volume of liquid brine. The remaining hot liquid brine flows through line 16 to a flash crystallization step 18 where more steam is generated, concentrating and cooling the remaining liquid brine, while reducing its volume even more. Steam generated in the separation step 14 is removed through line 22 to the steam conditioning step 26; similarly, steam removed from the flash/crystallization step 18 is removed to the steam conditioning step through line 24. The warm liquid brine effluent remaining after the flash crystallization step is removed through line 28 and introduced to primary clarification step 30 for removing silicon-containing components. Seed material to speed the formation of crystals can be removed through line 32 to the seed recirculation step 34 and introduced to the flash/crystallizer 18 through line 36. Added water 31 can be introduced into the primary clarifier through line 33 to bring the weight rate of the water to be injected up to at least 90%, preferably between about 95% and 105%, of the weight rate of the brine extracted at the brine extraction step 10. The effluent in line 38 from the primary clarification step 30 is introduced into the secondary clarification step 40 for further removal of silicon-containing components from the brine stream before it is passed through line 42 to the injection step 44 for injection back to the earth. If the effluent removed in line 38 is sufficiently clear, it may be directed through by-pass line 46 directly to the injection step 44, by-passing the secondary clarification step 40 entirely. If the brine stream contains silver values, the brine stream may be removed via line 52 to a silver recovery step 54 before the brine stream is replaced through line 56 to line 42 for injection. If silver is in the brine stream in line 46, it may be passed through lines 50 and 52 to the silver recovery step 54.

Following now the path of the steam generated from the brine, the steam produced at the wellhead separation step 22 and the flash crystallization step 24 is introduced to a steam conditioning step 26 for cleaning. The cleaned steam is removed through line 58 and used in power generation step 60 to produce electricity, which, in turn, is removed by line 62 to the electric power grid 64.

The power generation step uses steam turbines to produce power, which, in turn, generate steam condensate removed by line 66 to a steam condensate pH modification step 68 and also by line 67 to the cooling towers 69. In the conventional practice of geothermal power plant operators, most of the steam condensate is directed to the cooling towers 69. Although some steam condensate is directed through line 70 to be used for diluting crystal structure modifier and flocculent, the amount added in this manner does not make up for the amount lost through the cooling towers. This results in a volume deficit in the brine stream injected at step 44. Therefore, an additional source of make-up water must be used to ensure that the weight rate of the brine injected at step 44 is substantially the same as the weight rate removed from the earth at step 10. However, before water from any source, be it steam condensate or surface water, can be added to the brine stream, it must be treated to prevent system upsets in the brine stream.

The first source of water added to the brine stream is steam condensate. Since the flashing step to produce steam generated from geothermal sources also flashes both ammonia and hydrogen sulfide, if present in the brine removed from the earth, the steam condensate is typically at a pH different than neutral (pH 7). Therefore, the steam condensate, used for diluting the crystal structure modifier and flocculent, is pH adjusted (normally, it is acidified—shown in step 60) to within 2 pH units of the pH of the brine, which is between about 4 and 6 for a brine from the Salton Sea. The pH modified steam condensate is then removed in line 70. The pH modified steam condensate is used to dilute the first scale inhibitor at the first scale inhibitor addition 92, the second scale inhibitor at the second scale inhibitor addition 74, the third scale inhibitor at the third scale inhibitor addition step 80, and the flocculent at the flocculent addition step 86.

In detail, the points of addition of this first source of added water can be seen by following the path of the pH modified steam condensate in line 70. First the steam condensate in line 70 passes through line 72 to introduce at least some of the pH modified steam condensate into the second scale inhibitor addition step 74, and the diluted scale inhibitor produced is introduced into the brine stream through line 38. Similarly, pH modified steam condensate is introduced through line 78 into the third scale inhibitor addition step 80 for introduction through line 82 into the brine stream in line 42. Optionally, some of the pH modified steam condensate may be removed from line 84 and used in the flocculent addition step to dilute the flocculent, which is added through line 88 to the secondary clarifier. Finally, the pH modified steam condensate is added through line 90 into the first inhibitor addition step 92 to dilute the crystal structure modifier for addition through line 92 into the flash/crystallizer 18.

The second source of water added to the brine stream is surface water. The added water 31 can be from any surface source of water, but typically river or irrigation canal water is preferred. In the region of the Salton Sea, Calif., a major producing region of geothermal power, the use of the water from the Salton Sea is not possible since that water contains too many incompatible components. These incompatible components would normally cause massive system upsets despite all precautions taken. In general, it is preferred that water to be added to the brine stream contain less than 10,000 ppmw TDS, preferably less than 1000 ppm TDS, and less than 3500 ppmw $SO_4^{-2}$, preferably less than 900 ppmw $SO_4^{-2}$. Alternative water sources for the Salton Sea operations are class one irrigation water, the New River and the Alamo River, all local sources of water. In general, river and canal water will be acceptable sources of surface water, but they must first be treated before they are added to the brine. First, the pH of the surface water must be adjusted to approximately that of the brine. In the case of the Salton Sea operations, the pH of the river and canal water is usually changed by acidifying the water with a strong mineral acid, hydrochloric acid being preferred, to a pH of between about 4 and 6. Then, as a second step, the oxygen contained in the surface water must be removed to prevent iron precipitation and corrosion of iron and steel components in the processing equipment. Oxygen can be removed from the surface water by adding a strongly reducing additive, such as hydrazine, or the like, or by physically removing it by deaeration with low pressure steam from the flash/crystallizer 18 bubbled through the surface water. Finally, river and canal water is likely to contain large amounts of $SO_4^{-2}$. The crystal structure modifier already added at the first addition point reduces the potential for precipitation of $BaSO_4$ and NORMs caused by Ba and Ra in the brine and $SO_4^{-2}$ in the river or canal water.

The weight rate of the water added at step 31, plus the weight rate of the brine stream in line 28, will result in the weight rate of the water injected at step 44 being at least 90%, and preferably between 95 and 105%, the weight rate of the brine extracted from the earth at step 10. Since the extraction is continuous, the best comparison is usually weight rate extracted per hour versus weight rate injected per hour. Since the injected water is considerably cooler than the extracted brine, and cool water is more dense than hot water, less volume will be injected for an equivalent weight rate injected. The added water can be roughly analogized to make-up water for a conventional boiler, being added to the resource to be heated by geological forces to provide now hot brine and prevent the resource from going dry. But before surface water can be added to the brine stream as make-up water, at least some crystal structure modifier must have been added to the brine stream.

In the first crystal structure modifier addition step 92, the second crystal structure modifier addition step 74, and the third crystal structure modifier addition step 80 the same or different crystal structure modifiers may be introduced. A crystal structure modifier is any additive that will inhibit or prevent any or all species found in the brine from producing a scale or other substantially solid material that settles out of the brine. Crystal structure modifiers, exemplified by phosphonoalkylated amines, apparently interfere with the crystal growth of forming particles. Such particles remain entrained or suspended rather than growing, then precipitating and contributing to the formation of scale. The crystal structure modifiers are preferably selected from the group consisting of polyphosphonic acids, phosphonoalkylated amines, aminoalkyl phosphonates, and phosphonocarboxylate. Both pure compounds and mixtures and blends of the compositions listed can be used.

Both crystal structure modifier and flocculent are added in the overall process. It is unexplained why a crystal structure modifier should inhibit some dissolved solids from precipitating in a system where a flocculent is simultaneously used to accelerate the rate of precipitation of other solids. However, it is observed that adding a crystal structure modifier to the cooling brine stream causes some minerals and ions to remain in solution, while the rate of precipitation of other solids is accelerated by the simultaneous addition of a flocculent. As noted above, crystal structure modifiers can be selected from the group consisting of polyphosphonic acids, phosphonoalkylated amines, aminoalkyl phosphonates, phosphate esters, phosphonocarboxylate, and mixtures and blends of the compositions listed. The preferred crystal structure modifiers are selected from the group consisting of phosphonoalkylated amines and aminoalkyl phosphonates.

If the precautions noted above are taken, both river and canal water can be added to the brine stream to achieve 100% injection weight. This prevents the subterranean water supply from drying up or becoming more salty, making the entire formation easier to manage. The composition of a liquid brine obtained from an on-going geothermal operation in the Salton Sea, Calif. is shown in Table 1 and the composition of the brine condensate from the same source is shown in Table 2 below:

TABLE 1

Typical Composition of Salton Sea Brine Concentrate

| Analyte | mg/l | ppmw | Analyte | mg/l | ppmw |
|---|---|---|---|---|---|
| Ag | 0.1 | 0.1 | Mg | 115.0 | 100.0 |
| As | 16.0 | 14.0 | Mo | <0.01 | <0.01 |
| Au | <0.02 | <0.017 | Na | 67000.0 | 59500.0 |
| B | 390.0 | 340.0 | Ni | <0.2 | <0.17 |
| Ba | 137.0 | 120.0 | $NH_4^+$ | 360.0 | 300.0 |
| Be | <0.01 | <0.01 | Pb | 79.0 | 69.0 |
| Ca | 31500.0 | 27500.0 | Pd | <0.02 | <0.02 |
| Cd | 1.8 | 1.6 | Pt | <0.02 | <0.02 |
| $Cl^-$ | 180,600 | 150,500.0 | Rb | 96.0 | 84.0 |
| Co | <0.02 | <0.02 | Sb | 0.9 | 0.8 |
| Cr | 0.05 | 0.04 | Se | <0.02 | <0.02 |
| Cs | 0.05 | 0.04 | $Si(SiO_2)$ | 88 (188) | 77 (165) |
| Cu | 2.4 | 2.1 | Sn | <0.01 | <0.001 |
| Fe | 610.0 | 530.0 | Sr | 480.0 | 420.0 |
| Hg | <0.001 | <0.001 | $SO_4^{-2}$ | 120.0 | 100.0 |
| K | 15300.0 | 13200.0 | Ti | <1.0 | <0.9 |
| Li | 204.0 | 178.0 | V | <0.4 | <0.9 |
|  |  |  | Zn | 340.0 | 300.0 |
| pH | 5.5 |  | Br | 120.0 | 100.0 |
|  |  |  | F | 23.0 | 19.0 |
|  |  |  | I | 26.0 | 22.0 |

TABLE 2

Typical Salton Sea Stream Condensate Analysis

| Analyte | mg/kg | Analyte | mg/kg |
|---|---|---|---|
| CATIONS |  |  |  |
| Ag | <0.01 | Li | <0.01 |
| Al | <0.05 | Mg | <0.01 |
| As | <0.001 | Mn | <0.005 |
| B | 2.5 | Mo | <0.002 |
| Ba | <0.005 | Na | 0.09 |
| Be | <0.002 | Ni | <0.04 |
| Ca | 0.05 | Pb | <0.05 |
| Cd | 0.01 | Sb | <0.05 |
| Co | <0.02 | Se | <0.002 |
| Cr | <0.01 | Si | <0.03 |
| Cu | 0.075 | Sr | <0.04 |
| Fe | 0.01 | Ti | <0.01 |
| Hg | 0.0005 | V | <0.01 |
| K | 0.03 | Zn | 0.02 |
| ANIONS |  |  |  |
| $Cl^-$ | 1.0 | $OH^-$ | 50 |
| $CN^-$ | <0.01 | $S^{-2}$ | 35 |
| $CO_3^{-2}$ | 360 |  |  |
| MISCELLANEOUS |  |  |  |
| TDS* | 80 | $NH^{3+}$ | 270 |
| pH | 9.2 |  |  |

*TDS means Total Dissolved Solids

It can be seen that the brine is an extremely concentrated solution containing a great many components. As steam is removed during the flashing operation, the concentration of the dissolved components in the brine stream increases. The brine stream is therefore susceptible to upsets caused by the addition of even small amounts of the other components— particularly sulfate ion, which causes alkaline earth salts, including naturally occurring radioactive materials (NORMs), to precipitate.

The preferred flocculent are sold in commerce as solids and have the repeating structure represented by formula (1):

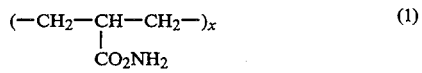

where $x = 10,000$ to $25,000$.

The individual effects of crystal structure modifiers and flocculent are very different with the difference and the magnitude of difference being highly unexpected. Their influence on particles in solution is directly opposite. In the usual mode of operation of this invention, the crystal structure modifier is added both before and after the flocculent. When the crystal structure modifier is added upstream of the clarifier stages, it is observed not to interfere with the action of the flocculent. Likewise, when the crystal structure modifier is added downstream of the flocculent, there is no observed interference caused by the flocculent on the action of the crystal structure modifier. Why the two classes of compounds have such different and exclusive effects in the same system remains a mystery.

The crystal structure modifiers are obtained as technical grade liquid compositions containing large amounts of components (e.g., inert ingredients) not described above. Cost considerations aside, it would be preferred to use pure compounds in the method of this invention. However, the technical grade compositions commercially available are useful in the method of the present invention. The concentration of active ingredients in any particular commercially available material is not generally important. It is only necessary that enough of the material be used to produce the desired concentration of the active ingredient in the brine. Preferably, however, the material will contain at least about 33 wt % of the active ingredients. It is especially preferred that the material contain more than about 50 wt % of the active ingredients.

The preferred crystal structure modifier has the structure, represented by phosphonoalkylated amines, shown in formula (2):

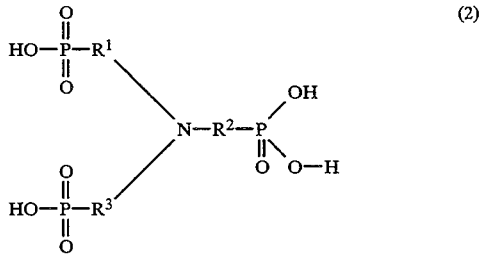

where $R^1$, $R^2$, and $R^3$ are the same or different and are (a) lower alkylene or (b) $NR^5R^6$, where $R^5$ and $R^6$ are the same or different, and $R^5$ can be a lower alkyl radical, hydrogen atom, or $R^7PO_3H_2$ (where $R^7$ is a lower alkylene radical), and $R^6$ can be a lower alkyl radical, a hydrogen atom, $(NR^8)_z$, where $R^8$ is defined the same as $R^5$ and z is 1 to about 10, or $R^7PO_3H_2$ (where $R^7$ is a lower alkylene radical). All references to lower alkyl or lower alkylene refers to alkyl or alkylene radicals having from one to ten carbon atoms, preferably between one and six carbon atoms. At least one of $R^1$, $R^2$, $R^3$, $R^5$, $R^6$, $R^7$, or $R^8$ are a lower alkylene group. The various salts, for example, sodium and potassium salts, are also included. One presently preferred compound is phosphonomethyl amine, that is $R^1$, $R^2$, and $R^3$ are all methylene groups.

The structure of a second class of preferred crystal structure modifiers included in formula (2) is shown in formula (3):

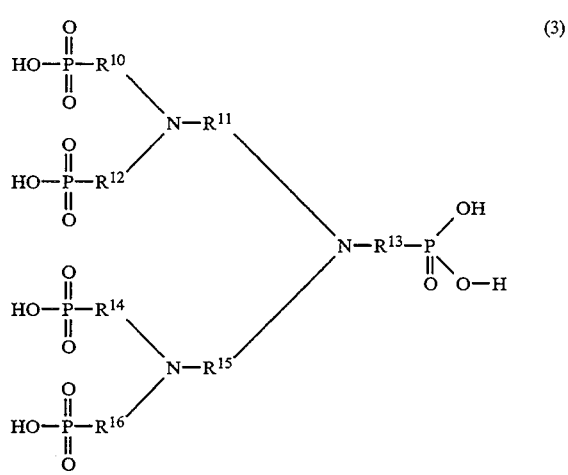

where $R^{10}$, $R^{11}$, $R^{12}$, $R^{13}$, $R^{13}$, $R^{15}$ and $R^{16}$ are the same or different and are lower alkylene, where lower alkylene is the same as previously described. The various salts, for example, sodium and potassium salts, are also included.

The crystal structure modifier must be added to the brine in an effective concentration, generally, at a rate sufficient to produce total concentrations of crystal structure modifiers in the brine between about 0.5 and 50 ppmw, preferably between about 1 and 10 ppmw, and most preferably between about 2 and 8 ppmw.

The technical solutions referred to above are liquids and can be added directly to the brine stream. However, it is greatly preferred to dilute the crystal structure modifier before addition to the brine stream. One problem with using waters available, such as river and canal water or irrigation water, is that the $SO_4^{-2}$ content of the waters is high enough to combine with a sizable amount of crystal structure modifier. Therefore, the use of the steam condensate, which contains virtually no $SO_4^{-2}$ is ideal. It is readily available and is otherwise not used. Since the crystal structure modifier is not particularly affected by pH, the pH modified steam condensate can be used. Therefore, the same acidic condensate can be used to dilute both the crystal structure modifier and the flocculent. Since different crystal structure modifiers may well be used at different addition points, each particular batch of modifier may have to be made up separately using the steam condensate. However, if the same crystal structure modifier is used at each addition point, only one batch of diluted crystal structure modifier need be made.

EXAMPLE

This example shows a laboratory scale test of the concept of diluting the brine with river water.

Once a successful process to inhibit the deposition of NORMs by adding crystal structure modifier was developed, as described in the aforementioned U.S. patent application No. 717,527, a fluid mixing study was conducted to compare the results of brine dilution incorporating NORMs inhibition with the previous studies that did not include NORMs inhibition. Jar testing was conducted using a mixture of New River water and clarifier overflow brine that was treated with a crystal structure modifier, in this case, at least 2 ppm of Visco 3919 NORMs inhibitor. First, the river water had its pH adjusted to between 4.5 and 5.5 by adding the appropriate amount of HCl while monitoring the resultant pH. Then, it was added to the brine. The mixing ratio was 30 vol % river water/70 vol % brine.

The mixture was spiked with additional inhibitor and solution compatibility was again achieved by acidifying the river water to maintain the pH of the brine. Treating the pH modified river water with 50 ppmv hydrazine hydrochloride oxygen scavenger controlled iron precipitation. At the 30/70 mixing ratio of water to brine, the sulfate ion concentration of the mixture (280 ppm) is significantly greater than the sulfate concentration of the brine alone (100 ppm). Such a concentrated mixture should be prone to sulfate precipitation, yet the mixture, in the presence of the Visco NORM inhibitor, precipitated less solid material than had been observed for either the mixture or brine in the absence of the NORMs inhibitor.

The results of this study show that New and Alamo River waters can successfully be employed to dilute the brine stream to provide injection volume makeup at the Salton Sea field without provoking system upsets, if the crystal structure modifier is first added to the mixture. To successfully achieve 100% injection will require continued treatment of the brine with NORMs inhibitor at 2 to 4 ppm before adding the river and canal water. Treatment of the brine stream to achieve 100% injection volume with river and canal water includes the steps of silt removal, probably by filtration by settling, acidification with HCl, and scavenging or mechanical removal of oxygen.

It must be remembered that, while this jar test was done on a volume:volume basis, in the field the dilution would be best done on a weight:weight basis. The volume injected will usually be less because the brine stream injected is so much cooler than the brine extracted. For example, at the Salton Sea, about 30% of the weight of the brine extracted is used to make steam, and the brine stream loses about another 0.08% volume because of precipitation. Therefore, the amount of surface water equivalent to about 30% of the weight of the brine extracted is needed as make-up at the Salton Sea.

This Application for Patent incorporates the disclosure of U.S. patent application Ser. No. 08/130,112, filed on Sep. 30, 1993, and mailed in the same envelope as the present Application for Patent, in full.

Although this invention has been primarily described in terms of a specific example and embodiments thereof, it is evident that the foregoing description will suggest many alternatives, modifications, and variations to those of ordinary skill in the art. Accordingly, the appended claims are intended to embrace as being within the spirit and scope of invention, all such alternatives, modifications, and variations.

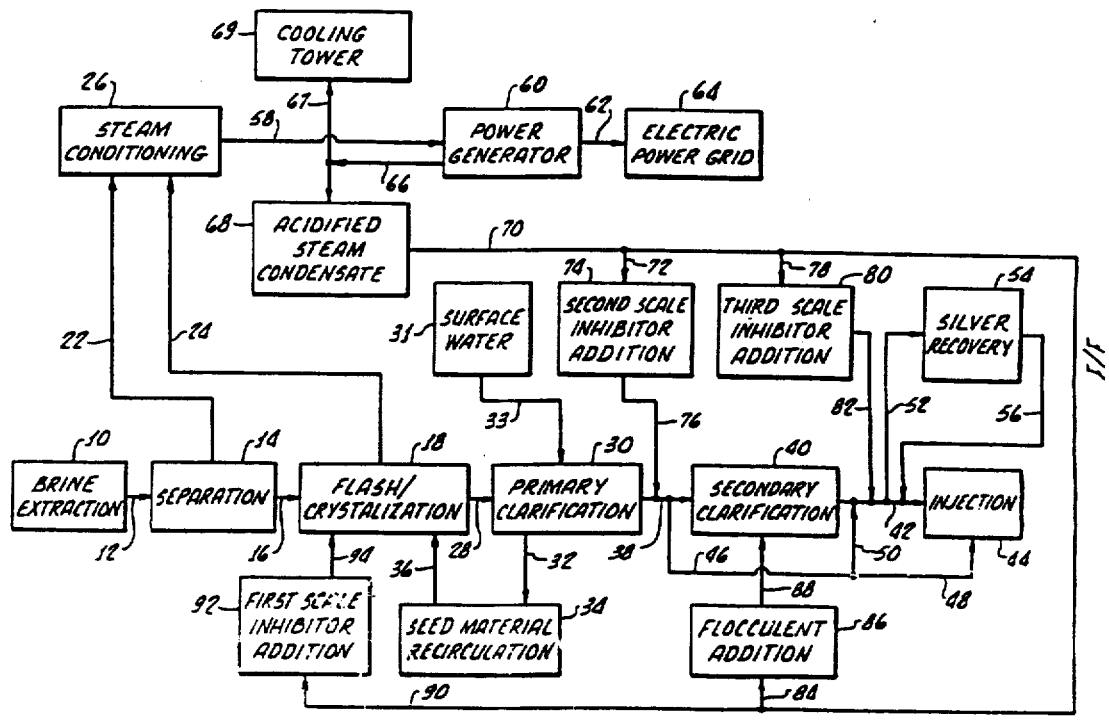

What is claimed is:

1. A method of injecting into the earth a geothermal brine stream remaining after flashing and a surface water comprising sulfate ions and oxygen, comprising:
   a) removing a geothermal brine which includes alkaline salts, silica, and iron ions from the earth;
   b) flashing the geothermal brine;
   c) adding a crystal structure modifier to the resulting liquid brine stream produced in step b) to inhibit deposition of said alkaline salts;
   d) adding to the liquid brine stream obtained in step c) a sufficient amount of said surface water pretreated to remove a portion of said oxygen and inhibit precipitation of substantial amounts of iron such that the total amount of water in the brine stream is at least 90% of the amount of the brine removed in step a);
   e) removing a portion of said silica from the combined surface water and brine stream: and
   f) injecting the combined surface water-brine stream obtained in step e) into the earth.

2. The method of claim 1 wherein the method further includes the step of adding the surface water to the brine stream while the brine stream is contained in a settling tank to allow the removal of flocculated silica.

3. The method of claim 2 wherein the liquid brine stream comprises a naturally occurring radioactive material and sufficient added crystal structure modifier such that no more than 30% of the naturally occurring radioactive material present in the brine stream precipitates with the flocculated silica.

4. The method of claim 3 wherein the adding the surface water step includes adding a reducing agent.

5. The method of claim 4 wherein the adding the surface water step further includes adding hydrazine.

6. The method of claim 4 wherein the adding the surface water step includes bubbling steam through the water.

7. The method of claim 1 wherein the weight rate of water in the brine stream after step d) is at least 95% of the weight rate of the brine removed.

8. A method of injecting into the earth a liquid geothermal brine stream produced after a geothermal brine flashing step comprising:
   a) flashing a hot geothermal brine removed from the earth and comprising alkaline salts, silica, and iron ions;
   b) adding a crystal structure modifier to the brine stream produced from the geothermal brine flashed in step a) to inhibit deposition of said alkaline salts;
   c) obtaining surface water comprising sulfate ions and oxygen;
   d) controlling the pH of said surface water to be within 2 pH units of the flashed brine and removing a portion of said oxygen sufficient to prevent a substantial amount of iron ion precipitation;
   e) adding enough pH controlled surface water to the liquid brine stream containing the crystal structure modifier to produce an aqueous stream having at least 90 wt % of the amount of the geothermal brine removed from the earth in step a);
   f) removing a portion of said silica from said aqueous stream; and
   g) injecting the aqueous stream obtained in step f) into the earth.

9. The method of claim 8 wherein enough crystal structure modifier is added to a brine stream in step b) that contains a radioactive component so that the total radioactivity of solids precipitated from the liquid brine stream is no more than 30% of the total radioactivity extracted from the ground.

10. The method of claim 8 wherein the method further includes the step of adding the surface water to a settling tank to allow the removal of flocculated silica.

11. The method of claim 8 wherein the step of removing oxygen includes adding a reducing agent.

12. The method of claim 11 wherein the step of adding a reducing agent includes adding hydrazine to the brine at a location downstream of where flashing of the brine first occurs.

13. The method of claim 8 wherein the step of removing oxygen includes bubbling steam through the water.

14. The method of claim 8 wherein the weight rate of water injected in step f) is at least 95% of the weight rate of the brine removed in step a).

15. The method of claim 14 wherein the weight rate of the water injected in step f) is at between 95 and 105% of the weight rate of the brine removed in step a).

16. A method of disposing of a geothermal brine comprising:
   a) adding a crystal structure modifier to a liquid brine stream containing alkaline salts, silica, and iron ions and remaining after a geothermal brine extracted from the ground has been flashed;
   b) adding to said liquid brine stream a surface water sufficiently deoxygenated to prevent substantial amounts of iron precipitation, said added surface water comprising a sulfate and having a pH within two pH units of the liquid brine stream to create a liquid stream having at least 90% of the weight rate of the geothermal brine before flashing;
   c) removing a portion of said silica from said liquid stream; and
   d) injecting the liquid stream into the earth.

17. The method of claim 16 wherein the method further comprises adding enough crystal structure modifier to a liquid brine stream in step a) that contains a radioactive material so that the total radioactivity of solids precipitated from the liquid brine stream is no more than 30% of the total radioactivity extracted from the ground in step a).

18. The method of claim 17 wherein the method further includes the step of adding the surface water to a settling tank to allow the removal of flocculated silica.

19. The method of claim 17 wherein the adding the surface water step includes adding a reducing agent.

20. The method of claim 19 wherein the adding of a reducing agent includes adding hydrazine.

21. The method of claim 17 wherein the adding the surface water step includes bubbling steam through the surface water.

22. The method of claim 17 wherein the crystal structure modifier is diluted with an effective amount of a condensate stream derived primarily from said brine.

* * * * *

UNITED STATES PATENT AND TRADEMARK OFFICE
CERTIFICATE OF CORRECTION

PATENT NO. : 5,413,718
DATED : May 9, 1995
INVENTOR(S) : Gallup, et al

It is certified that error appears in the above-indentified patent and that said Letters Patent is hereby corrected as shown below:

The title page should be deleted and substitute therefor the attached title page
Column 6, Table 1, line 19, under the column entitled "ppmw" delete "59500.0" and replace with - - 58500.0- - .

Signed and Sealed this

Twenty-sixth Day of September, 1995

Attest:

BRUCE LEHMAN

Attesting Officer

Commissioner of Patents and Trademarks

United States Patent [19]

Gallup et al.

[11] Patent Number: 5,413,718
[45] Date of Patent: May 9, 1995

[54] USE OF ADDED WATER TO ACHIEVE 100% INJECTION WEIGHT IN GEOTHERMAL OPERATIONS

[75] Inventors: Darrell L. Gallup, Chino; John L. Featherstone, El Centro, both of Calif.

[73] Assignee: Union Oil Company of California, Los Angeles, Calif.

[21] Appl. No.: 130,114

[22] Filed: Sep. 30, 1993

Related U.S. Application Data

[63] Continuation-in-part of Ser. No. 717,527, Jun. 19, 1991, and a continuation-in-part of Ser. No. 861,323, Mar. 31, 1992, which is a continuation-in-part of Ser. No. 717,527, Jun. 19, 1991.

[51] Int. Cl.$^6$ ............................................. C02F 5/08
[52] U.S. Cl. ........................... 210/696; 60/641.5; 166/267; 166/310; 210/700; 210/727; 210/718; 210/719; 210/747; 210/750; 210/757; 588/17
[58] Field of Search ............... 60/641.2, 641.5; 166/267, 310; 210/696–701, 713, 714, 719, 723, 726, 727, 728, 734, 747, 750, 757, 718

[56] References Cited

U.S. PATENT DOCUMENTS

| | | | |
|---|---|---|---|
| 1,592,647 | 7/1926 | Speller | 210/750 |
| 4,437,995 | 3/1984 | Rex | 210/714 |
| 4,500,434 | 2/1985 | Jost et al. | 60/641.2 |
| 4,522,728 | 6/1985 | Gallup et al. | 210/747 |
| 4,537,684 | 8/1985 | Gallup et al. | 210/641.2 |
| 4,615,808 | 10/1986 | Gallup et al. | 210/714 |
| 4,728,438 | 3/1988 | Featherstone et al. | 210/713 |
| 4,830,766 | 5/1989 | Gallup et al. | 252/8.552 |
| 4,869,066 | 9/1989 | Pye et al. | 60/641.5 |
| 4,874,529 | 10/1989 | Featherstone et al. | 210/713 |
| 5,024,769 | 6/1991 | Gallup et al. | 210/721 |
| 5,028,340 | 7/1991 | Gallup | 210/753 |
| 5,032,284 | 7/1991 | Gallup et al. | 210/697 |
| 5,044,439 | 9/1991 | Cenegy et al. | 210/701 |
| 5,061,373 | 10/1991 | Gallup | 210/697 |
| 5,073,270 | 12/1991 | Gallup et al. | 210/698 |
| 5,085,782 | 2/1992 | Gallup et al. | 210/696 |
| 5,098,578 | 3/1992 | Gallup et al. | 210/696 |
| 5,145,515 | 9/1992 | Gallup et al. | 75/712 |
| 5,145,656 | 9/1992 | Gallup et al. | 423/42 |
| 5,167,834 | 12/1992 | Gallup et al. | 210/747 |
| 5,182,027 | 1/1993 | Gallup et al. | 210/696 |
| 5,240,687 | 8/1993 | Gallup et al. | 423/42 |
| 5,246,593 | 9/1993 | Gallup | 210/709 |
| 5,256,301 | 10/1993 | Gallup et al. | 210/696 |
| 5,268,108 | 12/1993 | Gallup et al. | 210/698 |
| 5,288,411 | 2/1994 | Gallup et al. | 210/700 |

FOREIGN PATENT DOCUMENTS 788112 12/1957 United Kingdom ............... 210/757

Primary Examiner—Peter A. Hruskoci
Attorney, Agent, or Firm—Charles L. Hartman; William O. Jacobson; Gregory F. Wirzbicki

[57] ABSTRACT

Geothermal brines are extracted from the earth, flashed and the remaining liquids are injected back into the earth. Although it would be advantageous for resource maintenance to inject the same amount of liquid as extracted, addition of liquid causes massive system upsets that prevent such addition. River or other similar surface waters can now be added to the brine stream created when extracting power from a geothermal source, after adding a crystal structure modifier to the brine stream. In operations where the brine stream is returned to the earth, the weight rate of the brine injected into the earth is brought to at least 90% what it was when extracted from the ground.

22 Claims, 1 Drawing Sheet